United States Patent
Charbonnier

(10) Patent No.: US 7,933,582 B2
(45) Date of Patent: Apr. 26, 2011

(54) TELECOMMUNICATION SYSTEM WITH IMPROVED CONFIDENTIALITY

(75) Inventor: Philippe Charbonnier, Le Mesnil le Roi (FR)

(73) Assignee: Sagem Communication, Paris (FR)

( * ) Notice: Subject to any disclaimer, the term of this patent is extended or adjusted under 35 U.S.C. 154(b) by 387 days.

(21) Appl. No.: 10/489,801

(22) PCT Filed: Sep. 13, 2002

(86) PCT No.: PCT/FR02/03123
§ 371 (c)(1),
(2), (4) Date: Sep. 21, 2004

(87) PCT Pub. No.: WO03/026256
PCT Pub. Date: Mar. 27, 2003

(65) Prior Publication Data
US 2005/0020251 A1      Jan. 27, 2005

(30) Foreign Application Priority Data
Sep. 17, 2001 (FR) .................................. 01 12022

(51) Int. Cl.
*H04M 1/66* (2006.01)
*H04M 1/68* (2006.01)
*H04M 3/16* (2006.01)
*G06Q 40/00* (2006.01)

(52) U.S. Cl. ................... 455/410; 455/411; 455/414.1; 705/42

(58) Field of Classification Search ................ 455/410, 455/411, 414.1, 556.1, 550.1, 552.1; 705/40, 705/41, 42
See application file for complete search history.

(56) References Cited

U.S. PATENT DOCUMENTS

| | | | |
|---|---|---|---|
| 6,937,731 B2 * | 8/2005 | Chiu | 380/270 |
| 6,957,185 B1 * | 10/2005 | Labaton | 704/500 |
| 2002/0030579 A1 * | 3/2002 | Albert et al. | 340/5.9 |
| 2002/0077993 A1 * | 6/2002 | Immonen et al. | 705/77 |
| 2002/0147913 A1 * | 10/2002 | Lun Yip | 713/184 |
| 2005/0085226 A1 * | 4/2005 | Zalewski et al. | 455/426.1 |
| 2006/0000900 A1 * | 1/2006 | Fernandes et al. | 235/380 |

* cited by examiner

*Primary Examiner* — Un C Cho
(74) *Attorney, Agent, or Firm* — Gerald E. Helget; Nelson R. Capes; Briggs and Morgan, P.A.

(57) ABSTRACT

A telecommunications system includes a personal item held by a user of the system, a first means of communication made available to the user and capable of communicating with the personal item and with a data transfer network, and a second means of communication capable of communicating with the data transfer network and belonging to an interlocutor of the user. The first means of communication may be triggered between a non-transparent operating mode and a transparent operating mode during which it is incapable of acting on data passing through it. The system makes it possible to guarantee the user that the confidential data he may send will not be altered or saved by the first means of communication in view of its illicit use.

22 Claims, 3 Drawing Sheets

TELECOMMUNICATION SYSTEM WITH IMPROVED CONFIDENTIALITY

BACKGROUND OF THE INVENTION

This invention concerns a telecommunication system including:
a first means of communication capable of communicating with a data transfer network and intended to be made available to a system user, and
a second means of communication capable of communicating with said network belonging to an interlocutor of the user.

In this type of system, the first means of communication may consist of a terminal connected to an Internet network made available to the user in a cyber cafe, a hotel or an airport lounge.

The second means of communication may be a server connected to a database belonging to the interlocutor who will, depending on the user's choice, be an on-line bank or even a commercial company.

In this type of system, the user does not have control over the confidentiality of his own data. If, during an exchange with the interlocutor, the interlocutor asks for the user's I.D. or an access code or even a password, the information supplied in return by the user will transit through the first means of communication over which the user exercises only limited control, most often to interface functions. In particular, the user may not be certain that the first means of communication will not store the confidential information passing through it in a cached register in view of the future illicit use of said information by an unauthorized person who will have access to the cached register.

This state of affairs creates a feeling of insecurity among users that is harmful to the development of on-line trade through means of communication they do not own, and that is detrimental not only to on-line merchants, but also to the network operators and to the manufacturers of equipment intended for said networks.

The aim of this invention is to eliminate these disadvantages to a large extent by proposing a telecommunication system that provides the user with greater control over the confidentiality of his own data.

SUMMARY OF THE INVENTION

Indeed, according to the invention, a system that conforms to the introductory paragraph also includes a personal item intended to be held by the user, the first means of communication being capable of being configured in transparent operating mode during which said first means is incapable of acting on the data transiting between the personal item and the second means of communication.

The personal item may be a radiotelephone, a pocket organizer or any other device, preferably portable, in which the user has stored confidential data specific to it, like I.D. numbers, access codes and other passwords, or even bank or medical data.

The personal item will most often be equipped with smaller capacities than those offered to the user by the first means of communication in terms of speed and man/machine interface. The personal item and the first means of communication will be able to communicate via a wire or radio link.

In the system according to the invention, the first means of communication no longer has the practical opportunity to handle or store the data that passes through it inasmuch as it has been placed in transparent operating mode. Thus, if during an exchange between the interlocutor and the user, the user is invited to produce confidential data, the first means of communication will be placed in transparent operating mode before the confidential data is effectively transmitted by the personal item.

This measure, when communicated to them, will have the effect of reassuring users concerning the preservation of the confidentiality of their own data, and will thus contribute to the growth of on-line commerce.

The invention therefore also concerns a process for carrying out a transaction between two economic entities comprising a step during which at least one of the entities is informed of the fact that said transaction will be carried out by means of a telecommunication system as described above.

The configuration of the first means of communication in transparent operating mode may, depending on the case, be triggered by a command signal transmitted by the personal item, for example following receipt of a request for confidential data, or by the second means of communication, for example simultaneously or immediately after having transmitted such a request.

The personal item may generate this type of command signal automatically before transmitting confidential data or after having received the order from the user.

In an advantageous variant of the invention, the personal item will be capable of communicating directly with the second means of communication, for example by means of radio-frequency waves if the personal item and the second means of communication both have radio transmission/reception resources, for example compatible with the GSM or UMTS standards. In the telecommunication system conform to this variant, a direct communication is established between the personal item and the second means of communication when the first means of communication is configured in transparent mode.

By keeping the first means of communication out of the transaction, this type of direct communication makes it possible to guarantee that this first means of communication cannot endanger the confidentiality of the data exchanged between the personal item and the second means of communication.

In a particularly advantageous mode of embodiment of the invention, a telecommunication system as described above includes means of encoding the data transiting between the personal item and the second means of communication, which means of encoding are intended to be activated when the first means of communication is configured in transparent mode.

The means of encoding offer the user an additional guarantee concerning the confidential nature of the communication of his own data to the second means of communication.

The invention also concerns a device for transmitting/receiving radio frequency signals capable of fulfilling the functions of the personal item included in a telecommunication system as described above.

More generally, the invention also concerns a process for transmitting data between:
a first means of communication capable of communicating with a data transfer network and intended to be made available to a user of the process, and
a second means of communication capable of communicating with said network, belonging to an interlocutor of the user, a process including a step to configure the first means of communication in a transparent operating mode during which said first means is incapable of acting on data transiting between a personal item held by the user and the second means of communication.

In a variant of this process, a direct communication is established between the personal item and the second means of communication when the first means of communication is configured in transparent mode.

In a particularly advantageous mode of implementation of this process, the data transiting between the personal item and the second means of communication are encoded when the first means of communication is configured in transparent mode.

Thus, as indicated previously, this type of process makes it possible to assure the user of improved confidentiality of his own data and contributes to the development of electronic commerce.

The invention therefore also concerns a process for carrying out a transaction between two economic entities, comprising a step during which at least one of the entities is informed of the fact that said transaction will be carried out by means of a data transmission process as described above.

BRIEF DESCRIPTION OF THE DRAWINGS

The features of the invention mentioned above, along with others, will be clearer after reading the following description of a mode of embodiment, said description being given in relation to the appended drawings, which include.

DETAILED DESCRIPTION OF THE PREFERRED EMBODIMENTS

Figure 1:
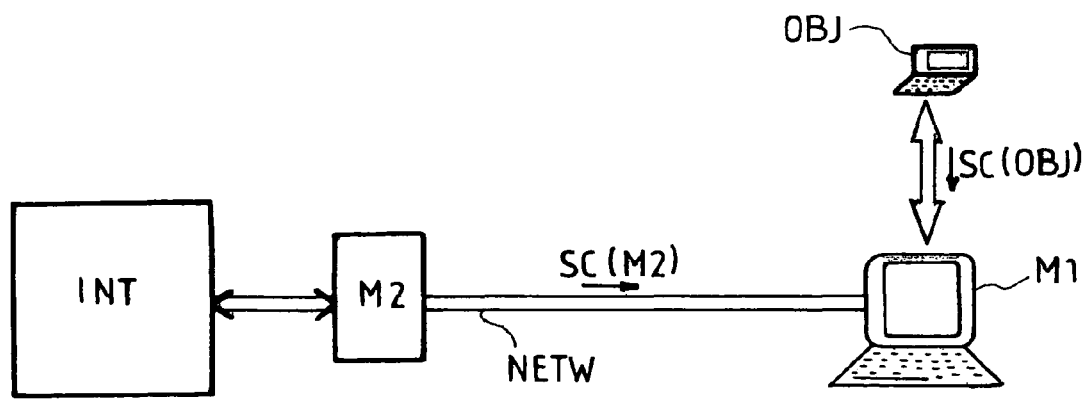
FIG. 1 is a functional diagram describing a telecommunication system according to the invention.

FIG. 1 is a schematic representation of a telecommunication system including:
- a personal item OBJ, intended to be held by a user of the system,
- a first means of communication M1 capable of communicating with the personal item OBJ, on the one hand, and with a data transfer network NETW, on the other hand, and intended to be made available to the user, and
- a second means of communication M2 capable of communicating with said network NETW, belonging to an interlocutor fNT of the user.

The personal item OBJ is, in this example, a pocket organizer, the first means of communication M1 being a multimedia terminal made available to the user in a cyber cafe or in an airport lounge, the second means of communication M2 being a server belonging to the interlocutor INT.

In this system, the first means of communication M1 can be configured in a transparent operating mode during which said first means M1 is incapable of acting on data transiting between the personal item OBJ and the second means of communication M2. The configuration in transparent operating mode of the first means of communication M1 can be triggered, depending on the case, either by means of a command signal SC(OBJ) transmitted by the personal item OBJ or by means of a command signal SC(M2) transmitted by the second means of communication M2.

For example, if the interlocutor INT is a banking establishment and transmits a request to the user in order to obtain confidential codes from the user such as an account number and a password making it possible to consult the status of said account, such a request will be indicated to the user who may order the personal item to transmit to the first means of communication M1 the command signal SC(OBJ) in order to place the fist means M1 in transparent operating mode before effectively sending the confidential data to the interlocutor INT. This transmission may be done in encoded form via means of encoding not shown in the figure, which will, for example, conform to the SSL (Secure Sockets Layer) specifications.

The command signal SC(OBJ) may be sent by the personal item automatically if it has previously been programmed to send this type of signal when a request for confidential data is identified. It is also possible for the second means of communication M2 to be configured so that it transmits a command signal SC(M2) aimed at placing the first means of communication M1 in transparent operating mode simultaneously with or immediately after the transmission of a request for confidential data by the second means of communication, which avoids any intervention of the personal item OBJ and/or of the user himself.

This type of command signal SC(OBJ) or SC(M2) can, for example, take the form of a special escape sequence inserted in the data flow sent to the first mode of communication M1. The transparent operating mode can be obtained in various ways: the first means of communication M1 may, for example, be configured so that during this operating mode, the first means of communication M1 will be prohibited from executing functions above a pre-set OSI level corresponding, for example, to error recovery activities. Any upper OSI level function, such as reading, storage or data alteration operations, will then be momentarily inhibited, thus guaranteeing the confidentiality of the data transiting through the first means of communication M1 configured in this way. A fortiori, if these data are encoded, the first means of communication M1 will be incapable of decoding them, and even less of altering them in a manner that is undetectable by the interlocutor INT.

Figure 2:
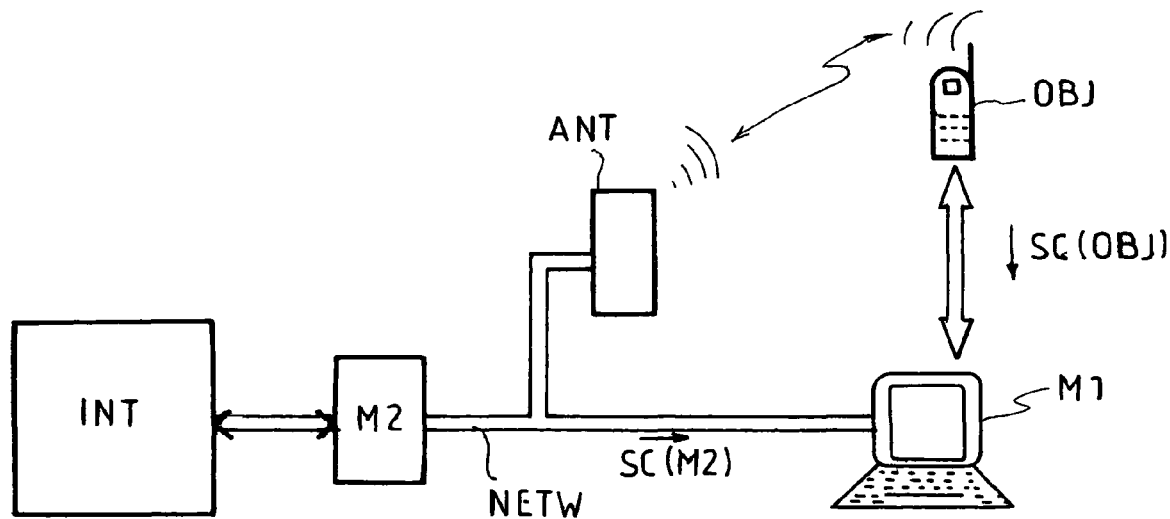
FIG. 2 is a functional diagram describing a variant of this type of telecommunication system.

FIG. 2 is a functional diagram that represents a variant of the telecommunication system previously described. The elements common to the two systems were assigned the same references and will not be described again. In this system, the personal item OBJ is a radiotelephone and the second means of communication M2 is equipped with ANT transmission/reception resources that make it capable of communicating with the personal item OBJ, for example through the intermediary of a GSM or UMTS cellular network. In this telecommunication system, a direct communication is established between the personal item OBJ and the second means of telecommunication M2 when the first means of communication is configured in transparent mode. This mode of embodiment of the configuration in transparent operating mode of the first means of communication M1 makes it possible to guarantee, by keeping the means M1 out of the data exchange between the personal item OBJ and the second means of communication M2, that the first means of communication M1 cannot endanger the confidentiality of the data thus exchanged between the personal item OBJ and the second means of communication M2.

Figure 3:
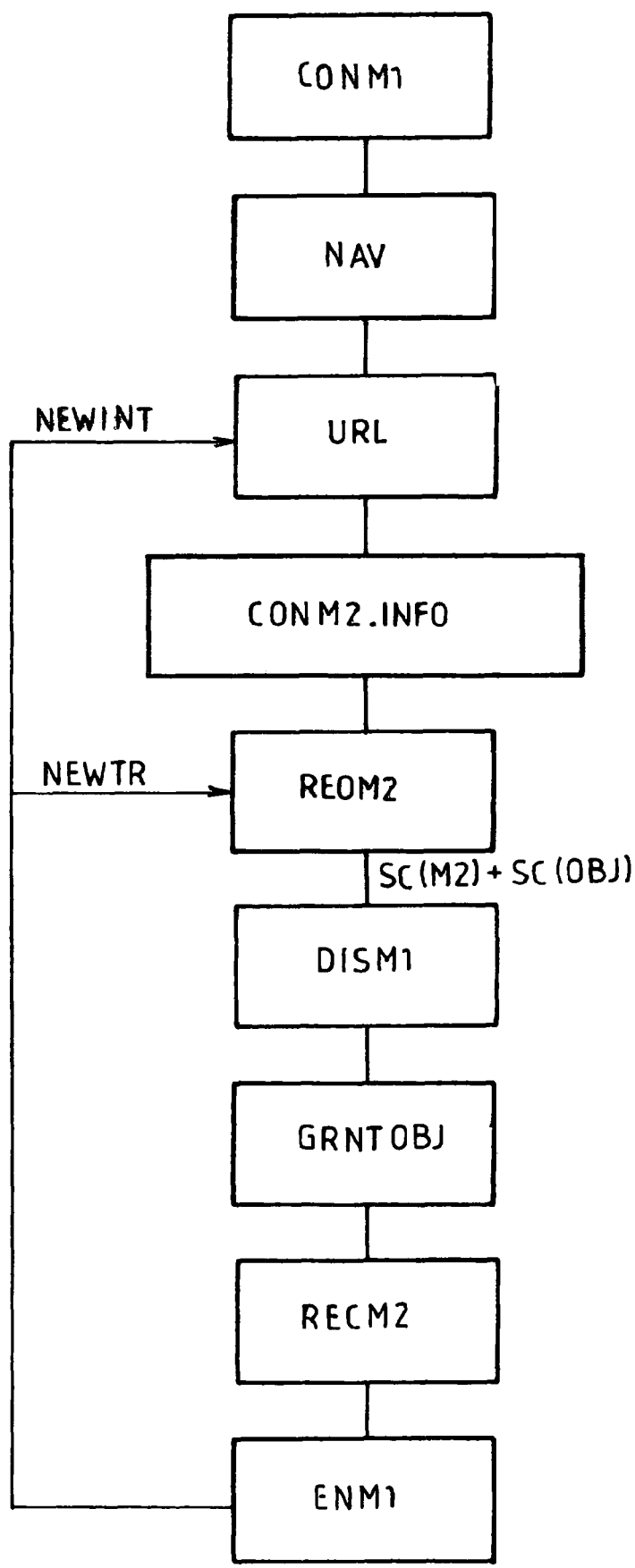
FIG. 3 is a flow chart describing a data transmission process implemented in these types of systems.

FIG. 3 is a flow chart that illustrates the data transmission process according to the invention. According to this process, during a first step CONM1, the user connects to the first means of communication M1, potentially via his personal item OBJ. During a next step NAV, the user launches a browser serving as interface with the data transfer network. During a next step URL, he enters the address in order to establish a connection with the interlocutor he has chosen. During a next step CNM2.INFO, the connection is established and the interlocutor INT informs the user that the data exchange will be performed by means of a telecommunication system or a process that conforms to the invention, in order to convince the user that the transmission of any sensitive data he might be led to supply to his interlocutor will benefit from optimal conditions of confidentiality. During a next step REQM2, the interlocutor INT requests data from the user specific to the user. For example, if the interlocutor is an on-line merchant, it may be led, during a transaction, to request a bankcard number from the user in order to withdraw the amount of the transaction from an associated bank account. This type of request may be accompanied by a command signal SC(M2) sent, simultaneously with or immediately after said request, by the second means of communication M2 to the first means of communication M1 in accordance with the conditions described previously, intended to configure the first means of communication M1 in transparent operating mode. Otherwise, the personal item OBJ may, upon receipt of this request, transmit, automatically or at the user's order, a command signal SC(OBJ) intended for the same purposes. The possible alternative nature of these events is indicated by the transition SC(M2)+SC(OBJ), in which it is necessary to understand the "+" operator in its Boolean sense of "OR." During a next step DISM1, the first means of communication M1 is configured in transparent mode and is incapable of acting on the data passing through it during this mode of operation, thus guaranteeing the confidentiality of the exchange then taking place between the second means of communication M2 and the personal item OBJ. During a next step GRNTOBJ, the personal item OBJ grants the request of the interlocutor INT and transmits the confidential data requested by it. In a next step RECM2, the second means of communication receives said data and lifts the inhibition imposed on the first means of communication. In a next step ENM1, said first means of communication M1 abandons the transparent operating mode and resumes Normal and non-secured operation until another exchange of sensitive data proves necessary, for example as part of a new transaction between the user and the same interlocutor INT, an option materialized by the transition NEWTR, or another transaction with a new interlocutor, an option materialized by the transition NEWINT.

It is clearly understood that as the user was informed during the step CONM2+INFO of the securitization, made possible thanks to the invention, of the data exchange to take place during the transaction he intends to conclude, said user will be more inclined to effectively proceed with this transaction. It is entirely possible to entrust the first means of communication M1 with the job of informing the user of this advantage further upstream in order to establish a climate of trust earlier, for example, at the time of the step CONM1 at the end of which the user is connected to the first means of communication M1.

Figure 4:
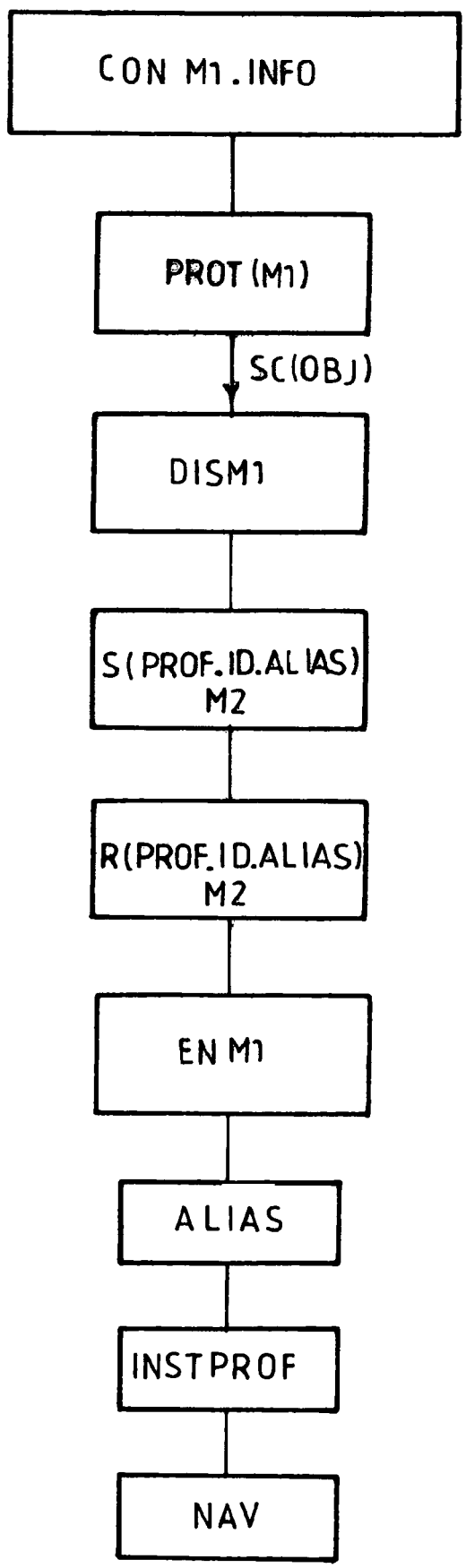
FIG. 4 is a flow chart describing a variant of this type of process.

FIG. 4 illustrates a variant of the process described above intended to be implemented in a telecommunication system in which the second means of communication M2 is integral with the first means of communication M1. In this case, the second means of communication M2 may, for example, be the server of a central database specific to a chain of cyber cafes or airport lounges, to repeat the previous examples, a chain to which the first means of communication M1 belongs. The user may wish to create and save a profile, that is, a set of network addresses and/or passwords and related access codes, and may desire that his real identify cannot be associated with this profile by the local terminal through which he communicates with this central database, in order to preserve local cybernetic anonymity. A telecommunication process according to this variant of the invention will thus advantageously include a first step CONM1.INFO during which the user connects to the first means of communication M1, potentially via his personal item OBJ. During this same step, the user is informed that, thanks to the use of a telecommunication system or of a process that conforms to the invention, he has the option of creating a personal profile or of extracting a personal profile from his personal item and of having it saved in the central database without any trace of his real identity subsisting locally in association with said profile. During a next step PROT(M1), an information exchange protocol between the personal item OBJ and the first means of communication M1 is implemented in order to allow said item to send a command signal SC(OBJ) to said first means in order to configure this means in transparent operating mode after the user has produced his profile. During a next step DISM1, the first means of communication M1 is configured in transparent mode and is incapable of acting on the data passing through it during this mode of operation, thus guaranteeing the confidentiality of any exchange taking place between the personal item OBJ and the second means of communication M2. During a next step S(PROF.ID.ALIAS)M2, the personal item OBJ transmits the profile produced by the user, accompanied by his real identity and an alias selected by the user, to the second means of communication M2. In a next step R(PROF.ID.ALIAS)M2, the second means of communication acknowledges receipt of said profile to the personal item OBJ, which triggers the release of the inhibition imposed on the first means of communication. In a next step ENM1, the first means of communication M1 abandons the transparent operating mode and resumes normal and unsecured operation. In a next step ALIAS, the user gives his alias to the first means of communication M1 in order to have his profile installed on said first means of communication M1. In a next step INSTPROF, the second means of communication M2 supplies the first means of communication M1, at its request, with the profile previously defined by the user, which profile is then effectively installed on the first means of communication M1. During a next step NAV, the user may launch a browser serving as interface with the data transfer network. This step may be followed by the steps that follow the homonymous step in the preceding figure.

It is clear from the preceding description that by improving the security conditions for electronic data exchanges, the invention will consequently reassure those who carry out such exchanges as long as they are informed of the advantages of the invention. The invention will thus contribute to the development of electronic commerce and to the respect of the privacy of users of data transfer networks.

The invention claimed is:
1. Telecommunication system comprising:
a first means of communication capable of communicating with a data transfer network and intended to be made available to a user of the system; and
a second means of communication capable of communicating with said network, belonging to an interlocutor of the user;
further comprising a personal item intended to be held by the user of the system and communicating with the first means of communication, and wherein the first means of communication is capable of being triggered to switch from a first normal and non-secured operating mode to a second transparent operating mode during which said transparent operating mode said first means of communication is incapable of acting on data as said data con- tinues to transit between the personal item and the second means of communication through the first means of communication.

2. The telecommunication system of claim 1, wherein the configuration in transparent operating mode of the first means of communication is triggered by a command signal transmitted by the personal item to the first means of communication.

3. The telecommunication system of claim 1, wherein the configuration in transparent operating mode of the first means of communication is triggered by a command signal transmitted by the second means of communication to the first means of communication.

4. The telecommunication system of claim 1, including means for encoding data transiting between the personal item and the second means of communication, which means of encoding are intended to be activated when the first means of communication is triggered to transparent mode.

5. The telecommunication system of claim 1, wherein the personal item is a radiotelephone.

6. A radio-frequency transmitter/receiver device capable of fulfilling the functions of the personal item included in a telecommunications system that conforms to claim 1.

7. A process for carrying out a transaction between two economic entities, comprising a step during which at least one of the entities is informed of the fact that said transaction will be carried out by means of a telecommunication system that conforms to claim 1.

8. Data transmission process between:
a first means of communication capable of communicating with a data transfer network and intended to be made available to a user of the process; and
a second means of communication capable of communicating with said network, belonging to an interlocutor of the user;
process including a step for triggering the first means of communication to switch from a normal and non-secured operating mode to a transparent operating mode during which said transparent operating mode the first means of communication is incapable of acting on the data as said data continues to transit between a personal item held by the user and the second means of communication through the first means of communication.

9. The data transmission process of claim 8, wherein the triggering step is triggered by a command signal transmitted by the personal item to the first means of communication.

10. The data transmission process of claim 8, wherein the triggering step is triggered by a command signal transmitted by the second means of communication to the first means of communication.

11. The data transmission process of claim 8, wherein the data transiting between the personal item and the second means of communication are encoded when the first means of communication is triggered to transparent mode.

12. A process for carrying out a transaction between two economic entities, comprising a step during which at least one of the entities is informed of the fact that said transaction will be carried out by means of a data transmission that conforms to claim 8.

13. Telecommunication system comprising:
a first means of communication communicating with a data transfer network and available to a user of the system;
a second means of communication communicating with said network, belonging to an interlocutor of the user; and
a personal item, separate from the first means of communication and communicating with the first means of communication to transmit confidential data of the user through the first means of communication and the second means of communication to the interlocutor;
wherein, during a transaction between the user and the interlocutor, the first means of communication changes from a normal and non-secured operating mode, during which the first means of communication is capable of viewing or acting on the confidential data transiting the first means of communication between the personal item and the second means of communication, to a transparent operating mode during which the first means of communication is incapable of viewing or acting on the confidential data continuing to transit between the personal item and the second means of communication through the first means of communication.

14. The telecommunications system of claim 13, wherein the first means of communication further comprises a terminal and the second means of communication further comprises a server.

15. The telecommunications system of claim 13, wherein the configuration in transparent operating mode of the first means of communication is triggered by a command signal transmitted by the personal item to the first means of communication.

16. The telecommunications system of claim 13, wherein the configuration in transparent operating mode of the first means of communication is triggered by a command signal transmitted by the second means of communication to the first means of communication.

17. A telecommunications system communicating confidential data of a user to an interlocutor, the telecommunications system further comprising:
a terminal, a server, and a network carrying the confidential data from the user through the terminal to the server;
a personal item, separate from the terminal, and in communication with the terminal to transmit the confidential data through the terminal and the network to the server; and
wherein the terminal changes from a first, normal and non-secured operating mode, during which the terminal is capable of viewing or acting on the confidential data transiting the terminal between the personal item and the server, to a transparent operating mode during which the terminal is incapable of viewing or acting on the confidential data continuing to transit between the personal item and the server through the terminal.

18. The telecommunications system of claim 17, wherein the configuration in transparent operating mode of the terminal is triggered by a command signal transmitted by the personal item to the terminal.

19. The telecommunications system of claim 17, wherein the configuration in transparent operating mode of the terminal is triggered by a command signal transmitted by the server to the terminal over the network between the terminal and the server.

20. A data transmission process in which confidential data is transmitted between a user and an interlocutor of the user through a personal item and a first means of communication separate from the personal item and communicating with a data transfer network, and a second means of communication communicating with said network and belonging to an interlocutor of the user; comprising the steps of:
(a) triggering the first means of communication to switch from a normal and non-secured operating mode, during which the first means of communication is capable of viewing or acting on the confidential data transiting the first means of communication between the personal item and the second means of communication, to a transparent operating mode during which the first means of communication is incapable of viewing or acting on the confidential data continuing to transit between the personal item and the second means of communication through the first means of communication;

(b) transmitting the confidential data from the personal item through the first means of communication to the second means of communication; and (c) triggering the first means of communication to switch from the transparent operating mode to the normal and non-secured operating mode.

21. The data transmission process of claim 20, wherein the configuration in transparent operating mode of the first means of communication is triggered by a command signal transmitted by the personal item to the first means of communication.

22. The data transmission process of claim 20, wherein the configuration in transparent operating mode of the first means of communication is triggered by a command signal transmitted by the second means of communication to the first means of communication over the data transfer network.

* * * * *